United States Patent [19]
Brady et al.

[11] Patent Number: 5,886,627
[45] Date of Patent: Mar. 23, 1999

[54] SIGNALING APPARATUS AND METHOD FOR TRAIL VEHICLES

[76] Inventors: Brian D. Brady, 5 White Pine La., Birchwood, Minn. 55110; Dale M. Schauls, 14425 119th St. North, Stillwater, Minn. 55082

[21] Appl. No.: 944,636

[22] Filed: Oct. 6, 1997

[51] Int. Cl.[6] .................................................. B60Q 1/52
[52] U.S. Cl. ........................... 340/471; 340/470; 340/468; 362/61
[58] Field of Search .................................. 340/471, 468, 340/474, 438, 479, 425.5, 427, 432, 435, 436, 463, 464, 470; 362/61

[56] References Cited

U.S. PATENT DOCUMENTS

5,563,577  10/1996  Adkins ..................................... 340/468

Primary Examiner—Jeffery A. Hofsass
Assistant Examiner—Daryl C. Pope
Attorney, Agent, or Firm—Skinner and Associates

[57] ABSTRACT

An apparatus and method for conveying information from a signaling trail vehicle to oncoming trail vehicles. The information typically pertains to traffic, environmental or other trail conditions present behind the signaling trail vehicle. The apparatus comprises a signaling device to convey information from the signaling trail vehicle to the oncoming trail vehicles, and an actuation mechanism for operating the signal device. The method comprises the steps of energizing a yellow/amber light to provide a caution to oncoming trail vehicles of a trail hazard and energizing a green light to provide an all-clear signal to indicate that no additional trail vehicles are following the signaling trail vehicle.

10 Claims, 6 Drawing Sheets

SIGNALING APPARATUS AND METHOD FOR TRAIL VEHICLES

BACKGROUND OF THE INVENTION

1. Field of the Invention

The present invention relates, generally, to vehicle operation signaling apparatus and methods. More particularly, the invention relates to an apparatus and method for signaling and conveying certain predefined information between operators of two or more trail vehicles such as snowmobiles. Most particularly, the invention relates to an apparatus and method for signaling and conveying information from the operator of a trail vehicle traveling in a first direction on a trail or route to the operator or operators of one or more oncoming trail vehicles traveling in a second, opposite direction on the trail or route, the information pertaining to traffic, environmental or other predefined trail conditions.

2. Background Information

The figures illustrate the apparatus and method of the present invention used in conjunction with snowmobiles. However, the present invention can be used with all types of trail vehicles. Therefore, for the purposes of this specification and the claims, the term "trail vehicle" incorporates all transportation means on a recreational trail, including but not limited to snowmobiles, all-terrain vehicles, cyclists, skaters, and skiers. Additionally, reasonable analogies can be extended from the descriptions associated with the term "snowmobile" to other types of trail vehicles.

The general use of recreational trails is currently popular and is growing in popularity both in the United States of America and internationally. In particular, the number of snowmobiles and riders has increased significantly over the past few years. Snowmobile riders often take extended trips on groomed trails and often travel in groups for both safety and social reasons. An affect of the increase in popularity of snowmobile riding is that snowmobile trails have become crowded with more and larger groups comprising both experienced and inexperienced riders. Well-groomed, scenic, and therefore popular trails are often rather narrow due to land ownership constraints, the topography of the land, and aesthetic considerations. These crowded, narrow, winding trail corridors within a forested area increase the hazard level for riders because the limited line of sight reduces the amount of time to react to hazards and reduces the amount of room to maneuver around hazards. A hazard of a particular concern is groups of snowmobiles passing in opposite directions, especially during extended rides when the riders are more subject to physical and mental fatigue.

The state of the art in snowmobile trail riding includes a loosely followed method or convention for signaling group size information from the operator of a snowmobile traveling in a first direction on a designated, confined snowmobile trail to the operator or operators of one or more oncoming snowmobiles traveling in a second, opposite direction on the trail. According to the current convention practiced by some typically more experienced riders, riders traveling in the first direction and riders traveling in the second direction signal the number of snowmobiles traveling behind them within their group by raising that number of fingers on one hand. The last rider in a group signals his or her status as the last rider by raising a closed fist.

This convention, as well as other signaling or warning methods used on recreational trails, are believed to have significant limitations and shortcomings. These limitations and shortcomings include the following:

(1) There is a lack of a standardized, common signaling apparatus for conveying group information or other pertinent traffic or safety information.

(2) Manual signaling does not have a universally understood and practiced signaling convention. Rather, these hand gestures are frequently confused with a greeting hand wave.

(3) Manual signaling, when understood and practiced, is dependent upon the mental diligence of the individual and is therefore subject to lapses and failures when the trail user becomes physically or mentally fatigued.

(4) Manual signaling is difficult to view and process in inclement weather, at higher speeds, and in low light or nighttime conditions.

(5) The manual signaling of a group number with a gloved, and particularly a mittened, hand is difficult to view and will often become an ambiguous hand gesture that conveys little or no information.

(6) Manual signaling of group size is limited by the number of fingers on one hand.

(7) Manual signaling may require the removal of one hand from the handle bars or steering system of the trail vehicle at a particularly hazardous time when trail vehicles are approaching and control is paramount.

The present invention provides a signaling apparatus and method which are believed to overcome at least some of the limitations and shortcomings of the known art to increase trail safety by providing:

(1) A standardized, common apparatus for signaling.

(2) An intuitive signaling method analogous to automobile traffic signals which could develop into a universal signaling convention used and recognized by most trail users.

(3) A signal that is easily recognized and easily set or reset while traveling on the trail. The signal is less subject to lapses and failures of fatigued trail users.

(4) A light or illumination-based signal that is viewable in inclement weather, at greater distances and speeds, and in low light or nighttime conditions.

(5) A clear, definite, and unambiguous signal.

(6) A signal regarding group configuration that is not limited by the number of fingers on one hand.

(7) A signal that can be actuated while maintaining complete control of the steering system of the trail vehicle. In the case of a snowmobile or a bicycle for example, a hand does not have to be removed from the handle bars to actuate the signal.

BRIEF SUMMARY OF THE INVENTION

The present invention provides an apparatus and method for signaling and conveying information from a signaling trail user traveling in one direction (first direction) on the trail to the one or more oncoming trail users traveling in the opposite direction (second direction) on the same trail. The information preferably pertains to traffic conditions present immediately behind the trail user traveling in the first direction (i.e. ahead of the trail users traveling in the second direction). The information is particularly concerned with whether or not additional trail users are following the signaling trail user. In the preferred embodiment of the apparatus and the preferred mode of the process, a specific illuminated color indicates that a signaling trail user is either (a) the first or an intermediate member of a group, and thus warns that more trail users are following the signaling trail user, or (b) the last member of the group. The conveyed information from the lights may alternatively or further include other information about the current group such as group size or speed, about another proximate trailing group of trail users, or about emergency, environmental, weather, hazard and other pertinent trail conditions. The apparatus and process of this invention may also be used in conjunction with the common hand signal or other current warning conventions. Furthermore, each light signal may be used in conjunction within a flasher circuit, wherein each specific flashing pattern for a specific color of light conveys predetermined information.

In a basic embodiment used on a snowmobile, the apparatus comprises at least one signal or status light disposed on the front hood or cover of the snowmobile. The light is connected to a power source and an actuation mechanism disposed such that it may be easily actuated by the rider while maintaining control of the snowmobile. The signal light projects forward and is visible to oncoming riders, depending on the illumination intensity, at greater distances in normal weather conditions, in inclement weather conditions, at higher speeds, and in low light or nighttime conditions.

Importantly, the signal light or pattern of signal lights is a standard convention and provides meaning and pertinent information to the riders. In a preferred embodiment, the apparatus comprises an array of lights. The lights may be of a variety of types, configurations, sizes and colors (including clear or white light). In a most preferred embodiment, the array of lights comprise a yellow/amber light and a green light. A preferable signal convention would be analogous to automobile traffic signals so that they can easily develop into a universal, standardized use, i.e. a yellow/amber light warns oncoming riders that additional members of the group are trailing the signaling member, and a green light indicates that the snowmobile is the last or trailing member of the group and that there are no known upcoming trail hazards for the oncoming group.

In a basic aspect, the method of signaling traffic on a recreational trail within a group comprises the following steps: the first and all intermediate users signal that another member of the group is following, and the last user signals that there are no more trailing members of the group. The signal is viewed by oncoming trail users. Importantly, the signal is based on a standard convention that conveys definite information to the oncoming riders. More particularly, the method comprises using an amber/yellow light to caution oncoming traffic that there is a trailing member approaching, and a green light to convey an all-clear signal to indicate that there are no more trailing members of the group.

The features, benefits and objects of this invention will become clear to those skilled in the art by reference to the following description, claims and drawings.

DETAILED DESCRIPTION

Figure 1:
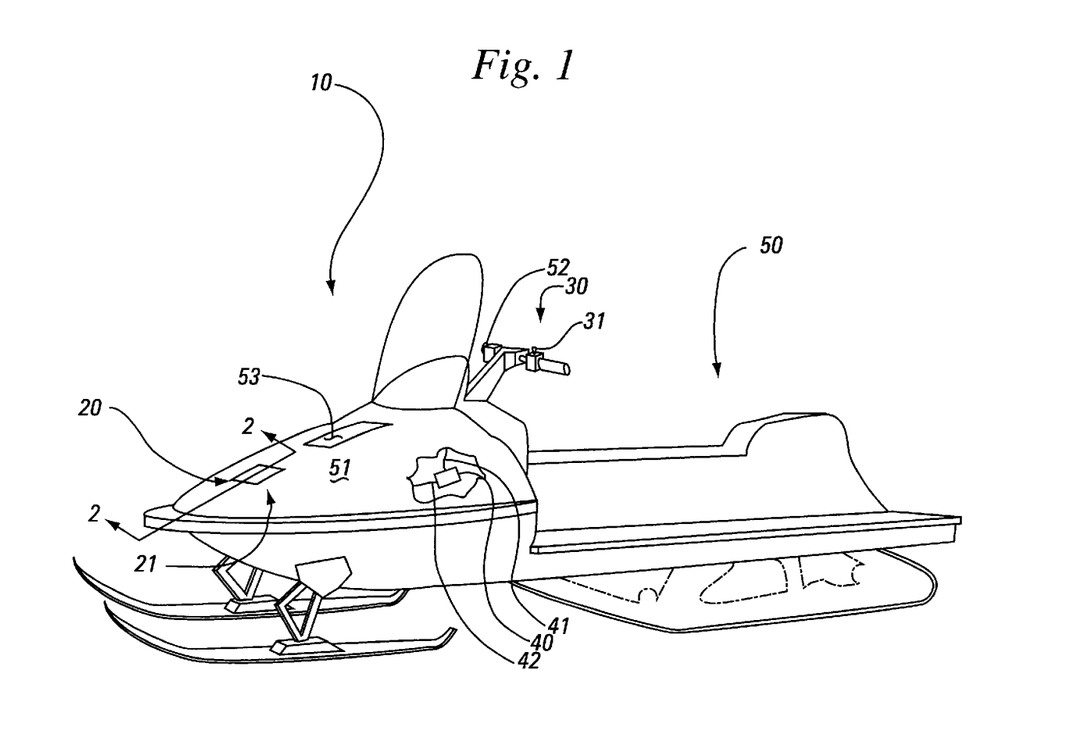
FIG. 1 is a perspective view of a snowmobile having a first embodiment of the signaling system of the present invention.
Figure 2:
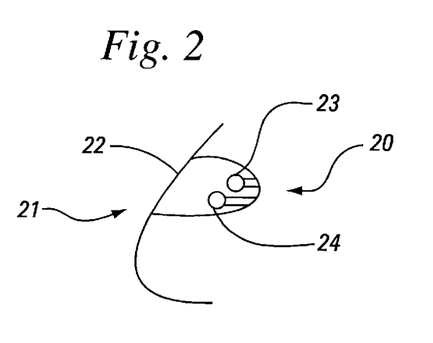
FIG. 2 is a partial cross-sectional view along line 2—2 of FIG. 1 of the signaling system.
Figure 5:
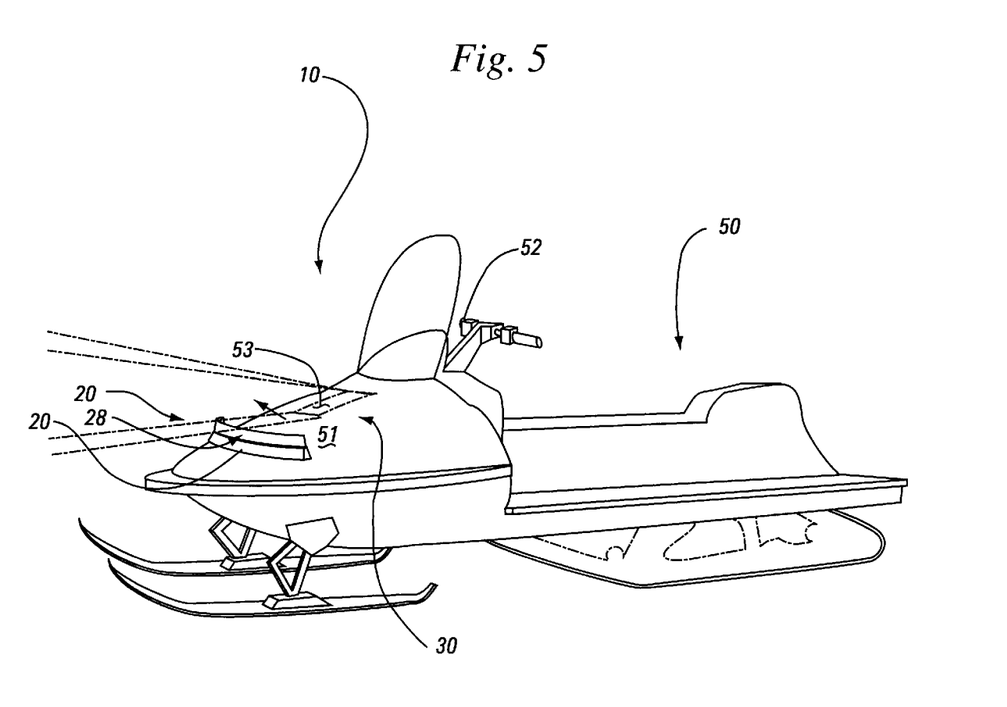
FIG. 5 is a perspective view of a snowmobile having a fourth embodiment of the signaling system using a retractable colored lens in front of the headlight.
Figure 6:
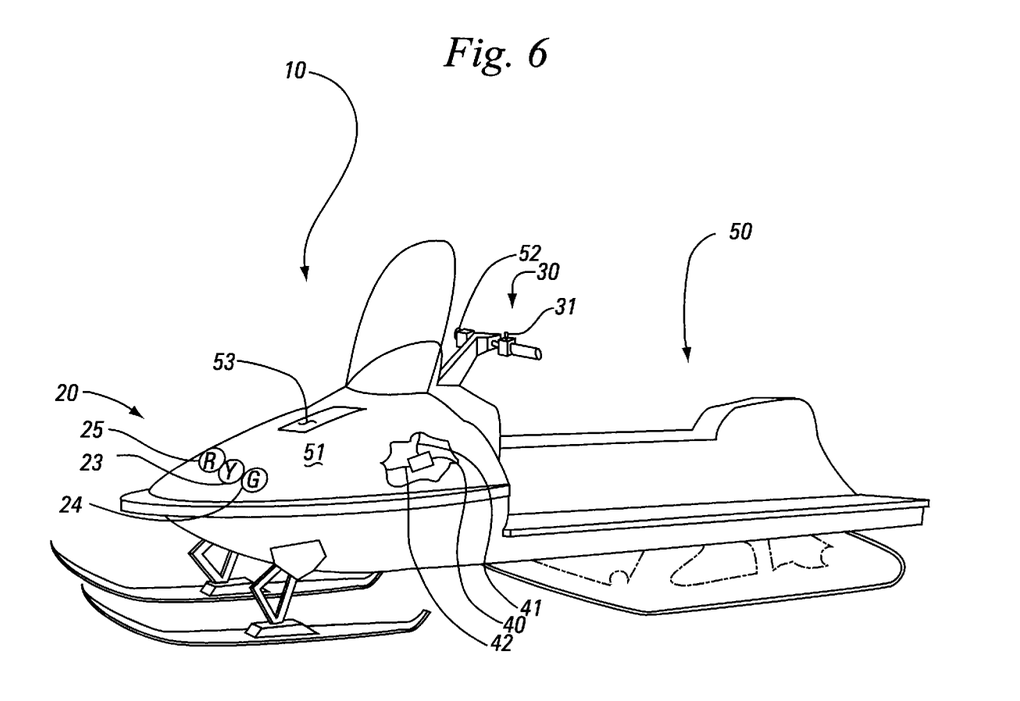
FIG. 6 is a perspective view of a snowmobile having a fifth embodiment of the signaling system.
Figure 7:
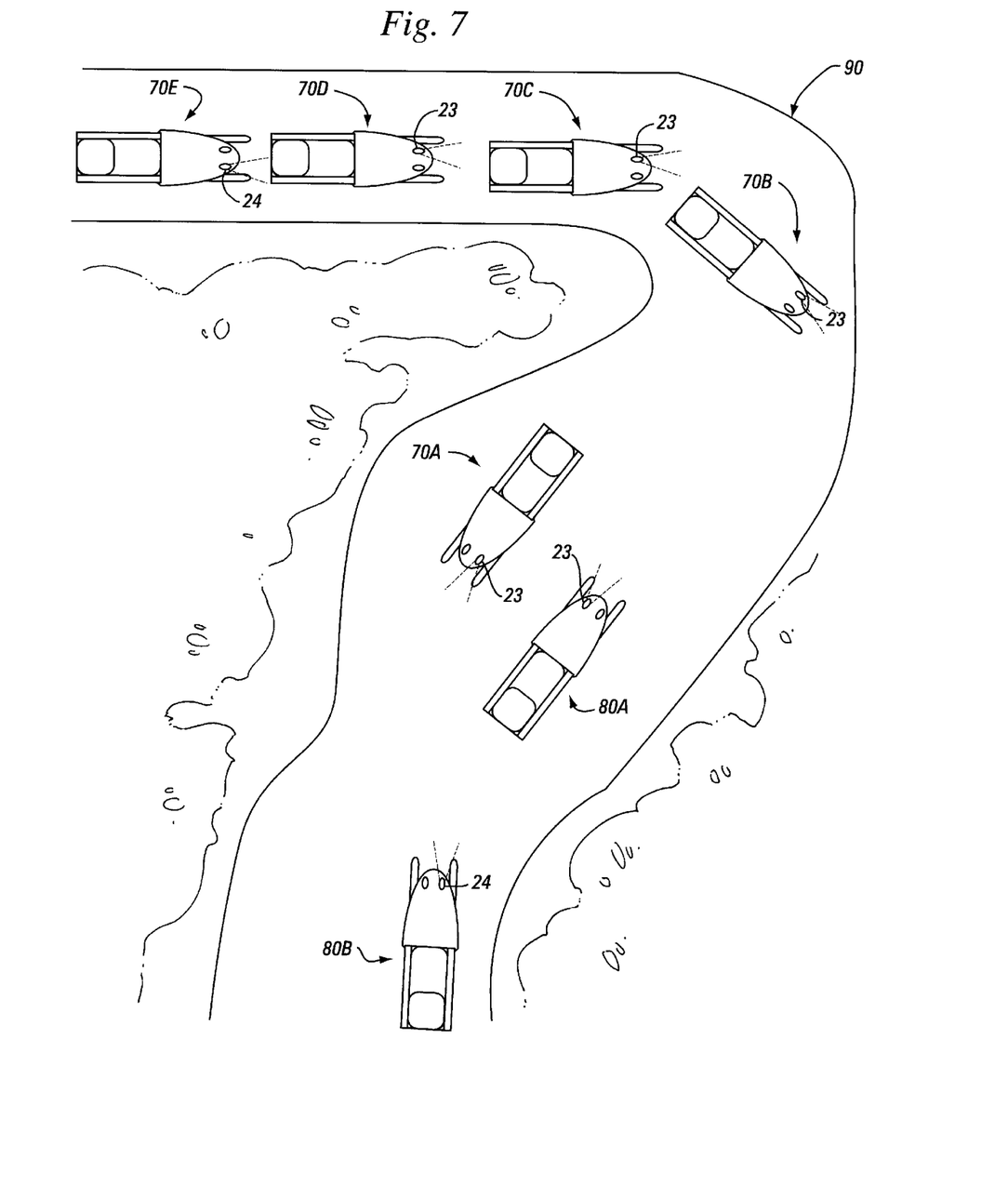
FIG. 7 is a diagram showing a typical snowmobile trail with two groups of opposing snowmobiles, each of which has the signaling system, and further illustrating the signaling process of the present invention.

A preferred embodiment of the signaling apparatus 10 of the present invention is illustrated in FIGS. 1–2. FIGS. 3–6 illustrate alternative embodiments of the signaling apparatus 10. FIG. 7 illustrates a method for conveying information between trail vehicles using the signaling apparatus 10.

Figure 3:
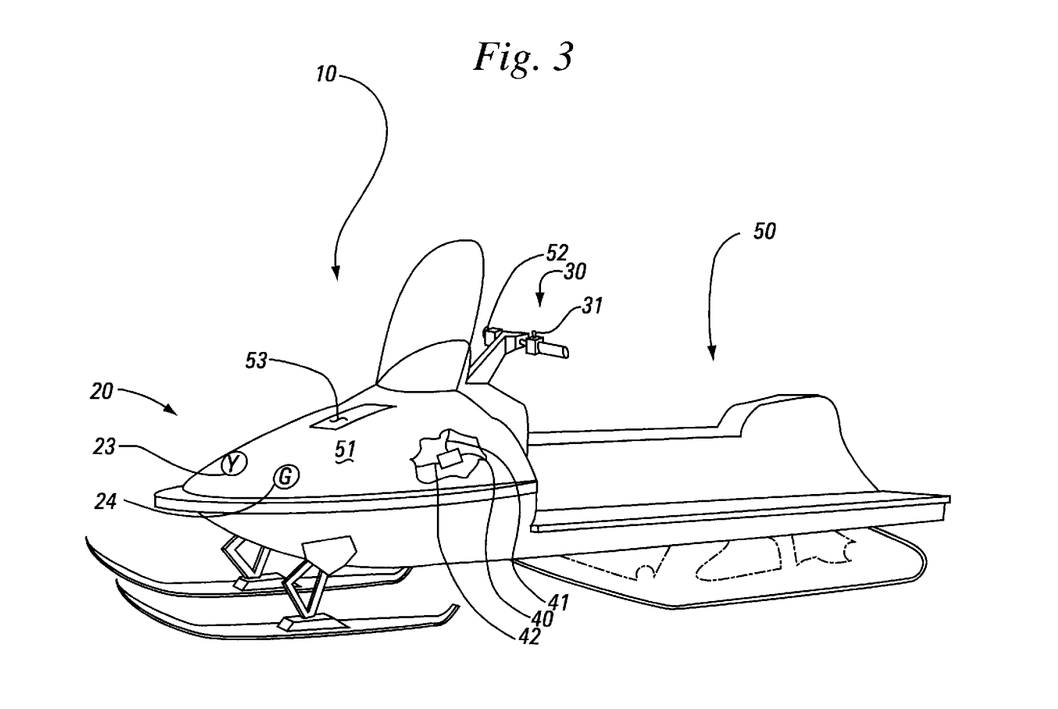
FIG. 3 is a perspective view of a snowmobile having a second embodiment of the signaling system of the present invention.
Figure 4:
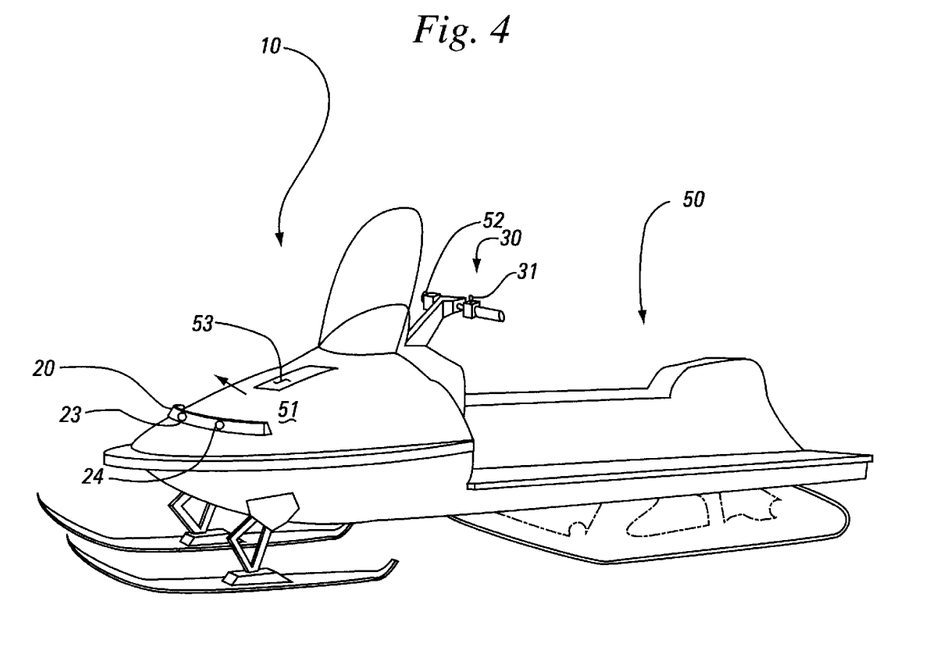
FIG. 4 is a perspective view of a snowmobile having a third, retrofitted embodiment of the signaling system.

As previously noted, the signaling apparatus 10 can be used on a variety of trail vehicles such as snowmobiles, all-terrain vehicles, and bicycles. It can even be used by skaters or cross-country skiers. However, the signaling apparatus 10 has particular utility used in conjunction with snowmobiles 50 because snowmobiles typically travel at higher speeds on narrow and winding trails with a limited line of sight. Furthermore, the injuries associated with snowmobile accidents tend to be more severe because of these factors. The signaling apparatus 10 is a safety device that could significantly reduce these snowmobile accidents as well as other accidents that occur on recreational trails. The apparatus could be designed and manufactured into new snowmobiles as illustrated in FIGS. 1, 3 and 6 or it could be retrofitted into old snowmobiles as illustrated in FIGS. 4 and 5.

The signaling apparatus 10 generally comprises a signal device 20 and an actuation mechanism 30. The signal device 20 is installed on the hood 51 of the snowmobile 50 so as to be clearly visible to oncoming snowmobile traffic. The actuation mechanism 30 typically includes a switch 31 located on the handle bars 52 of the snowmobile 50. The switch 31 may be of any variety, including a toggle type, rocker type, or push button type. It is anticipated that the actuation mechanism 30 could also consist of a variety of proximity or pressure sensors. The actuation mechanism 30 is positioned on the handle bars 52 which allows an operator to actuate the signaling device 20 while keeping both hands on the handle bars 52. Therefore, the position of the actuation mechanism 30 allows the operator to maintain control of the snowmobile 50 when approaching oncoming snowmobiles, and thus reduces the risk of accidents. The actuation mechanism 30 is electrically connected to the signal device 20 through a fuse or control box 40 using control and power wires 41 and 42. Electrical power to operate the signal device 20 may either be generated by the snowmobile 50 or may be provided by a separate power supply battery located within the control box 40.

All of the embodiments of the signal device 20 provide a means for providing a colored illumination signal. FIGS. 1 and 2 show a preferred embodiment of the signal device 20 incorporated by manufacturers' design into one lamp 21 recessed in the hood 51 of the snowmobile 50. The lamp 21 projects colored light forward through the transparent lens 22. The signal device 20 can project either a yellow/amber or a green signal by energizing either the yellow/amber light 23 or the green light 24 housed within the lamp 21. FIG. 3 shows a signal device 20 comprising a recessed yellow light 23 and a recessed green light 24 incorporated by manufacturers' design into the hood 51 for new snowmobiles 50. FIG. 4 shows a bolt-on signal device 20 that includes a yellow light 23 and a green light 24. This bolt-on signal device 20 could be designed to be retrofitted onto existing snowmobile models and installed either by snowmobile dealers or by the end users. A retrofitted embodiment encourages the development of a standardized, universal signaling convention since riders of older model sleds can practice the convention. FIG. 5 shows a signal device 20 that uses a colored translucent lens 28 positioned in front of the headlight 53 of the snowmobile 50. The lens 28 may be designed to be automatically retractable using an actuation mechanism on the handle bars 52, or it may be designed to be inserted in front of the headlight 53. In this embodiment, the headlight illuminates the lens 28 and forms an actuation mechanism 30. This design is less desirable than the other designs because the rider would have to stop and get off of the snowmobile each time that the signal should be changed. This inconvenience would discourage the development of a standardized, universal convention for conveying meaningful information. However, it does provide a low-cost option for certain trail users to practice the signaling convention if they can preset the signal for a constant or relatively constant condition. FIG. 6 shows a signal device 20 similar to that shown in FIG. 3 comprising a recessed yellow light 23, a recessed green light 24, and a recessed red light 25 incorporated by manufacturers' design into the hood 51 for new snowmobiles 50.

FIG. 7 illustrates a method for conveying information between two groups of snowmobiles 70 and 80 on a narrow, winding trail 90. Traffic information is being conveyed from each trail vehicle 70a, 70b, 70c, 70d and 70e in a first group 70 to each oncoming trail vehicle 80a and 80b in a second group 80. Likewise, each trail vehicle 80a and 80b in the second group 80 conveys information to each oncoming trail vehicle 70a, 70b, 70c, 70d and 70e in the first group 70. Specifically, each trail vehicle signals whether or not they are being trailed by additional trail vehicles in their group. FIG. 7 shows the front member 70a of the first group 70 cautioning each member of the second group 80 that there is a trailing member 70b by projecting a yellow/amber light 23. Likewise, members 70b, 70c and 70d are also projecting a yellow/amber light 23 to signal that they are followed by a trailing member. Member 70e indicates that it is the last member in group 70 by projecting the green light all-clear signal 24. The second group 80 reciprocates this signaling process. Member 80a displays the yellow/amber light caution signal 23 to warn of the approach of member 80b, and member 80b displays a green light all-clear signal 24 to indicate that member 80b is the last member in group 80b. It is important to note that the green all-clear signal 24 used in this convention only indicates that there are no more members of groups 70 and 80 trailing members 70e and 80b respectively and that the operator of the snowmobile is not aware of unexpected upcoming trail hazards for the oncoming group. Therefore, the oncoming group is still responsible for exercising reasonable caution for the trail and weather conditions.

This invention anticipates numerous embodiments for a signaling apparatus and method for trail vehicles. Specifically, the signaling device 20 could use different colors or signal patterns to convey larger amounts of specific information. For example, as indicated in FIG. 6, the signaling device could include three (3) different colored lights, preferably red, yellow and green. The red light could distinguish the first member from the intermediate members of a group, or it could indicate an exigent condition requiring the oncoming group to proceed with particular caution, or it could indicate an emergency or distress signal. Furthermore, it is anticipated that each colored light could have multiple flashing patterns to allow more information to be associated with each colored light. The flashing pattern could be created through the use of a flasher fuse or control circuitry within the control box 40. Multiple conditions can be associated with one light by using multiple flashing patterns. For example, all of the above-mentioned possible conditions for a red light could be associated with a specific flashing pattern for that red light. Finally, rather than using light-generated signals, it is anticipated that other signaling devices 20 such as colored, reflective flags could be used to practice the convention for signaling trail vehicles described herein.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A signaling apparatus for a signaling trail vehicle to convey off-road trail traffic information to an oncoming trail vehicle, said traffic information including whether another trail vehicle is following said signaling trail vehicle, comprising:

(a) a signal device for communicating off-road trail traffic information from a signaling trail vehicle to an oncoming trail vehicle, said signaling device being a color-coded light signal, said light signal being connected to an electrical power supply, said color-coded light signal projecting;
      (i) a distinct first colored light, said first colored light conveying a trail caution signal from said signaling trail vehicle to said oncoming trail vehicle, said trail caution signal indicating that another trail vehicle is following said signaling trail vehicle; and
      (ii) a distinct second colored light, said second colored light conveying a trail all-clear signal from said signaling trail vehicle to said oncoming trail vehicle, said trail all-clear signal indicating that no other trail vehicles are following said signaling trail vehicle; and (b) an actuation mechanism for operating said signal device, said actuation mechanism being electrically connected to said color-coded light signal, said actuation mechanism being proximately positioned to a trail vehicle steering interface.

2. The signaling apparatus of claim 1, wherein said light is energized in a flashing pattern to convey off-road trail traffic information.

3. The signaling apparatus of claim 1, wherein said first colored light is a yellow/amber light and said second colored light is a green light.

4. The signaling apparatus of claim 3, wherein said signal device further includes a red light to convey off-road trail traffic information.

5. The signaling apparatus of claim 1, wherein said trail vehicles are snowmobiles.

6. A method for conveying off-road trail traffic information from a signaling trail vehicle to an oncoming trail vehicle, said traffic information including whether another trail vehicle is following said signaling trail vehicle, said signaling trail vehicle having a signal device, said method comprising the steps of:

(a) energizing said signal device to project a distinct first colored light, said first colored light conveying a trail caution signal from said signaling trail vehicle to said oncoming trail vehicle, said trail caution signal indicating that another trail vehicle is following said signaling trail vehicle; and (b) energizing said signal device to project a distinct second colored light, said second colored light conveying a trail all-clear signal from said signaling trail vehicle to said oncoming trail vehicle, said trail all-clear signal indicating that no other trail vehicles are following said signaling trail vehicle.

7. The method for conveying off-road trail traffic information from a signaling trail vehicle to an oncoming trail vehicle of claim 6, wherein said first colored light is a yellow/amber light and said second coloredlight is a green light.

8. The method for conveying off-road trail traffic information from a signaling trail vehicle to an oncoming trail vehicle of claim 7, further including the step of energizing said signal device to project a red light to convey trail traffic information.

9. The method for conveying off-road trail traffic information from a signaling trail vehicle to an oncoming trail vehicle of claim 6, furtherincluding the step of energizing said signal device in one or more flashing patterns to convey trail traffic information for each of said one or more flashing patterns.

10. The method for conveying off-road trail traffic information from a signaling trail vehicle to an oncoming trail vehicle of claim 6, wherein said trail vehicles are snowmobiles.

* * * * *